June 26, 1923.
J. W. ROUPRICH
1,459,992
RESILIENT WHEEL
Filed June 24, 1920
2 Sheets-Sheet 1
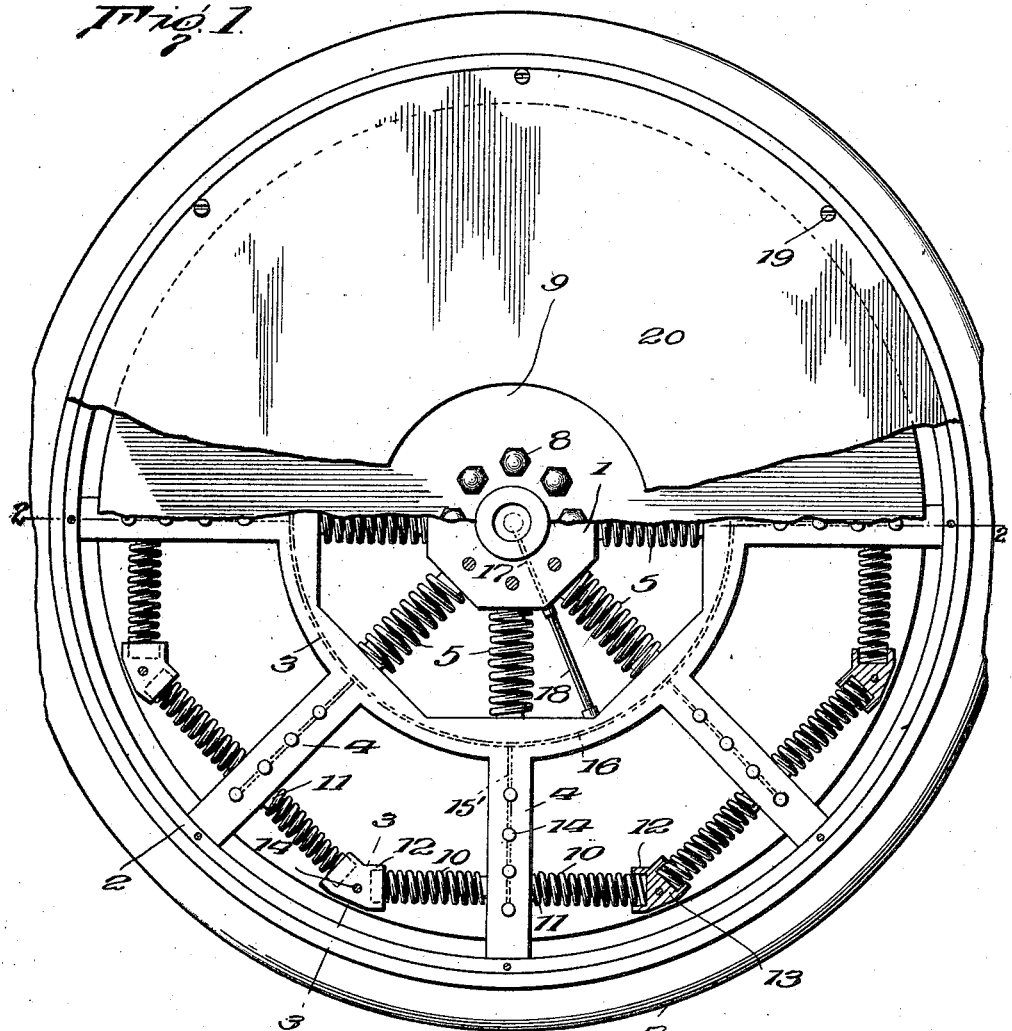
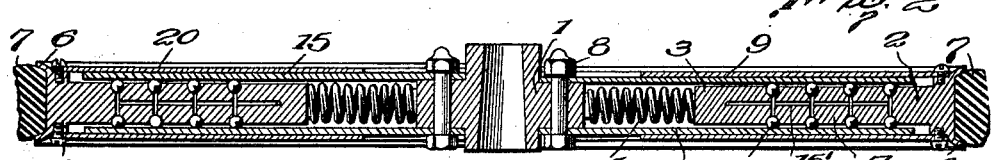
Inventor
James W. Rouprich
By Herbert J. Jacobi
Attorney

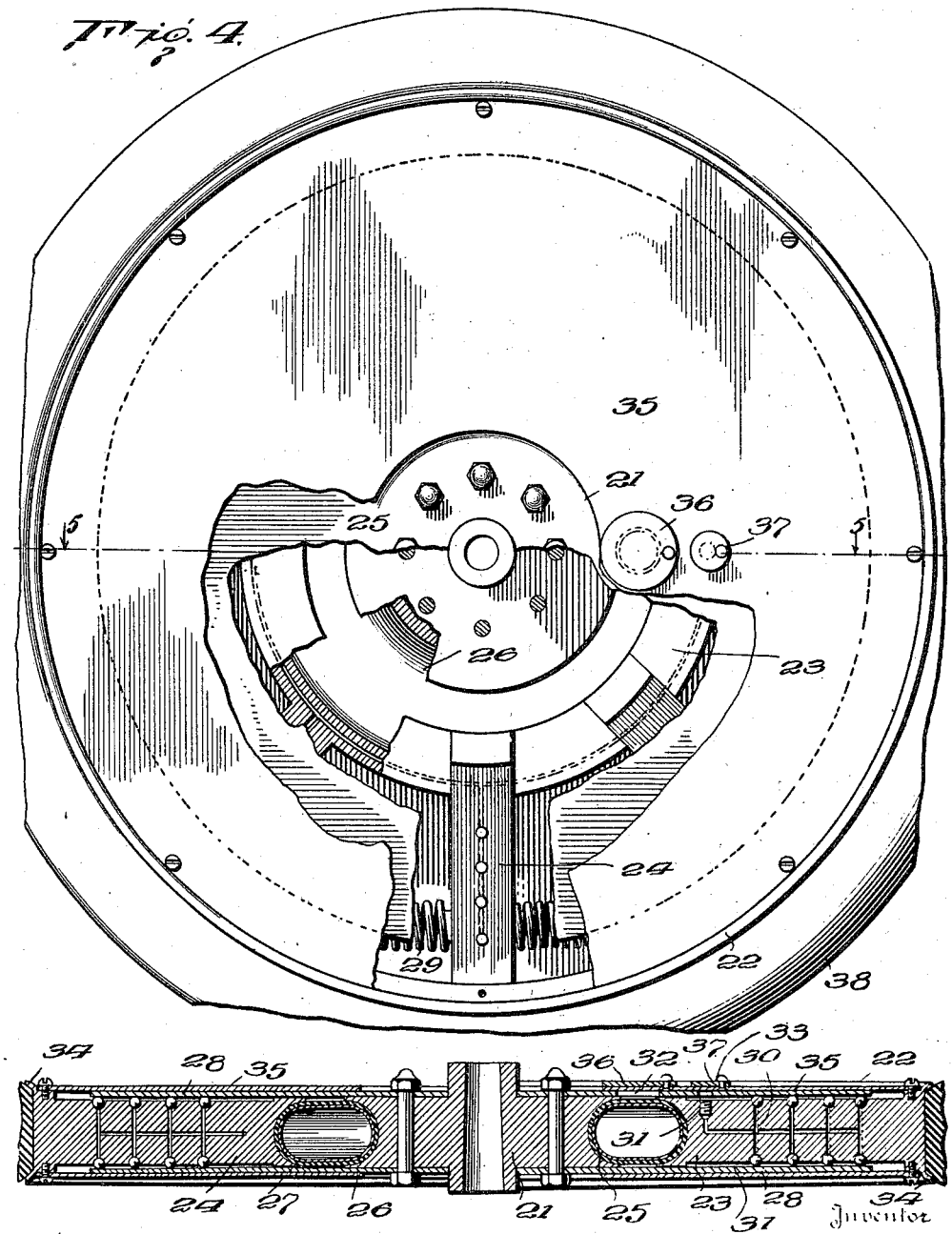

Patented June 26, 1923.

1,459,992

UNITED STATES PATENT OFFICE.

JAMES W. ROUPRICH, OF WASHINGTON, DISTRICT OF COLUMBIA.

RESILIENT WHEEL.

Application filed June 24, 1920. Serial No. 391,323.

*To all whom it may concern:*

Be it known that I, JAMES W. ROUPRICH, a citizen of the United States, residing at Washington, in the District of Columbia, have invented certain new and useful Improvements in Resilient Wheels, of which the following is a specification.

This invention relates to new and useful improvements in resilient wheels and the primary object of the invention is to provide a device of this character wherein a wheel is provided consisting substantially of two elements, one, a stationary element with respect to the axle on which it is carried and two, a movable or floating element with respect to the stationary one.

A further object of the invention resides in providing a device of this character wherein springs or pneumatic means are provided for the purpose of absorbing the shock incident from running on irregular road beds and to generally provide comfortable riding in automobiles, trucks, coaches, cars and other vehicles requiring use of wheels.

Still another object of the invention resides in providing such a spring construction as will permit of the wheel coming in contact with obstructions in the path thereof to allow torsional movement of the floating element without affecting the body of the car or the working parts of the wheel.

A still further object resides in providing a resilient wheel which is simple and durable in construction, inexpensive to manufacture, economical in operation and one which will be extremely efficient in use, overcoming the many difficulties which have heretofore been experienced in connection with wheels of this character.

With these and other objects in view, my invention consists in the novel features of construction, combination, and arrangement of parts as will be hereinafter referred to and more particularly pointed out in the specification and claims.

In the accompanying drawings, forming a part of this application,—

Figure 1 is a side elevation of a wheel constructed in accordance with my invention, with parts broken away to illustrate the working elements of the wheel.

Fig. 2 is a transverse section therethrough, as seen on the line 2—2, of Fig. 1.

Fig. 3 is an enlarged detail section as seen on the line 3—3, of Fig. 1.

Fig. 4 is a side elevation of a slightly modified form of the invention, with parts broken away to illustrate the operating parts of the same; and Fig. 5 is a transverse section therethrough as seen on the line 5—5 of Fig. 4.

In describing the invention, I shall refer to the drawings, in which similar reference characters designate corresponding parts throughout the several views and in which 1 designates a one-piece cast steel hub around which is circumscribed a felloe 2 which is also formed of cast steel, the latter being integrally cast with an inner rim section 3 through the medium of spoke sections 4. Secured between the hub 1 and the inner rim section 3 in alignment with the aforesaid spoke sections 4 are the coil springs 5, which act substantially as continuations of said spoke sections to afford resiliency between the hub and the felloe. As illustrated in the drawing, there are eight spoke sections 4 and correspondingly eight springs 5, but it will be understood that any number of such spokes and springs may be provided as are found desirable or necessary to afford the greatest efficiency.

The outer peripheral edge of the felloe 2 has a rim section 6 cast integral therewith in which is supported, in the usual or any preferred manner a tire 7 which, as shown in the drawing, is preferably of solid rubber. Secured to the hub 1 by means of bolts and nuts indicated in the drawing as 8 and extending to a point substantially one inch from the rim 6 are the two cover plates 9, which are also formed of cast steel. These plates entirely obscure from view the working elements constituting the resiliency of this wheel, and in connection with these plates and the spoke sections 4, I have provided a means for resiliently retaining the wheel proper with respect to these plates which means will also act to absorb shocks, and prevent undue torsional movement.

To this end, I have provided a pair of coil springs 10, for operation in connection with each spoke section 4. These springs rest in engagement at their inner ends with lateral projections 11 which are cast on opposite sides of these spoke sections, adjacent their outer ends. These springs 10, projecting outwardly from each spoke section have their outer ends resting in engagement with pockets or the like 12 formed on opposite faces of stop blocks 13. These stop blocks 13 are cast integral with one of the cover plates 9, as clearly shown in the detail section illustrated in Fig. 3, and said blocks afford a means for the securing thereto by means of set screws 14 of the opposite cover plate 9. These stop blocks 13 are, of course, cast intermediate of each two spoke sections when the wheel is set up for use and said blocks are of such thickness in casting as to permit of a slight play or clearance between the cover plates and the felloe, so that the felloe, which for convenience may be termed the moving element of the wheel, may have a floating or moving mounting with respect to the plates and the hub, which for convenience may be said to be the immovable portions of the wheel. These springs 10, mounted in the manner described and shown, will have a tendency to retain the floating or movable section of the wheel in the position as shown in Fig. 1 of the drawing, with respect to the immovable portion thereof, but it is readily observed that in the operation of this wheel, contact of the latter with any obstruction which will cause the movable part or elements to yield will be compensated for by the springs 10. These springs are so positioned and arranged as to absorb all shocks incident to the engagement of the wheel with obstructions and to control the movement of the floating element of the wheel at all times. These springs will allow torsional movement of the aforesaid floating or movable element of the wheel without affecting the body of the vehicle to which the wheel is attached and without interfering with the working elements of the wheel whatsoever. The greatest difficulties heretofore experienced with spring wheels have been in the provision of means to absorb the shock and return the moving elements, if there be any, to their initial positions without affecting the operating parts. This construction described will positively overcome the difficulties and carry out the purpose for which the same is designed.

As stated hereabove, the cover plates 9 when applied to the hub terminate at their peripheral edges substantially one inch from the rim 6. The space between the rim and the plates allows for the vertical or other movement of the floating element with respect to the immovable element. It will also be observed that the peripheral edges of the plates act as stops for engagement with the rim 6, when the one inch play, just referred to has been taken up in the movement of the floating element with respect to the immovable element. It will be understood at this time that the springs 5 and 10 are of such tension and are so arranged as will, under normal condition, retain the floating element in an equally adjusted position with respect to the remaining elements of the wheel. Thus the one inch space between the plates 9 and the rim 6 is only utilized when shocks occur.

In order to prevent the cover plates 9 and the felloe 2 contacting with one another in the operation of the wheel I have provided a ball-bearing structure. In each of the spoke sections 4 I have mounted a plurality of bearing balls 14 which are arranged vertically in sockets provided therein for the purpose, and these sockets communicate with oil conduits 15' in each of said spoke sections. The various conduits 15' communicate in turn with a main oil conduit 16 formed in the inner rim section 3, and the conduit 16 communicates with a similar conduit 17 in the hub through the medium of a flexible communication 18, the latter extending between the hub and the inner rim section 3, as clearly shown in Fig. 1 of the drawing. Any means may be provided for supplying the oil to these conduits.

The rim 6 is provided with annular shoulders which project slightly beyond the planes of the outer faces of the plates 9 and removably secured thereto by means of the set screws or bolts 19 are the dust shields 20 which are constructed of flexible metal. These shields 20 project to a point adjacent the hub 1, entirely enclosing the inner elements and the one inch opening between the rim and the plates 9. It will be understood that these dust plates contact with the plates 9 at the inner peripheral edge, being of flexible metal, but do not clamp the plates therebetween.

In Figs. 4 and 5, I have shown a slightly modified form of the invention, wherein pneumatic means is provided between the stationary hub and the moving felloe. To this end I provide a wheel which consists of a hub section 21, a felloe 22, an inner rim section 23 which is cast integral with the felloe by means of the spokes 24, similar to the construction illustrated in connection with the previously described form. The outer periphery of the hub 21 and the inner peripheral edge of the inner rim-like section 23 are concaved as shown at 25 to form substantially sections of a rim, whereby to receive therebetween a tire casing 26 within which is mounted an inflatable tube 27. Sufficient air is introduced to the tube as will cause the tire to space the rim section 23 from the hub 21 at all times, and this space will be sufficient to allow movement of the rim section 23 and its co-acting parts with respect to the hub and its connecting elements.

Cover plates 28, similar to the plates 9, are secured to the hub 21 in a manner similar to that illustrated in the previously described form and arranged between the plates and the spokes 24 are the springs 29, similar to the springs 10, heretofore described in the form shown in Figs. 1 to 3 inclusive. The mounting of these springs and the positioning of the same are the same in this form of the invention as heretofore referred to.

Each of the spokes 24 is provided with a plurality of bearing balls 29, the same as referred to heretofore, the sockets therefor communicating with lubricating channels or conduits 30, which are lodged only in the spoke sections and the inner rim sections 23. The means for supplying lubricant to these conduits is through the medium of an opening 31 in the rim section 23, which opening is plugged, as clearly shown in Fig. 5.

The outer side cover plate 28 is provided at a predetermined point with an opening 32 to enable the admission of an operator's hand for the purpose of inflating the tube 27. Also formed in the foresaid plate 28 adjacent the opening 32 is a second opening 33 to enable the plug for the opening 31 to be removed, when desired.

Mounted on shoulders of the rim 34, formed at the outer periphery of the felloe 22 are the dust plates 35, similar to the dust plates 20 heretofore referred to. The outer dust plate 35 has pivoted gates or the like 36 and 37 thereon which cover openings therein corresponding respectively with the openings 32 and 33 of the cover plate, hereabove mentioned.

A tire 38 is mounted in the rim 34, preferably of hard rubber but any form of tire may be substituted, when desired. Otherwise, the form herein described may be said to be the same as that form described in Figs. 1 to 3 inclusive.

In both forms of the invention hereabove described, I have referred to a resilient means between the hub of the wheel and the inner rim section, springs being described in the first form and pneumatic means being described in the second form. It will be understood that I do not limit my invention to this construction, as I may well utilize the invention without the use of this resilient means between the inner rim section and the hub. By eliminating this resiliency entirely between the hub and inner rim section, reducing the space between the two elements but allowing sufficient clearance for movement therebetween, which movement will be governed by the play or clearance between the cover plates and the rim, I will have provided a resilient wheel which will eliminate many working parts and which will simultaneously provide for the movement of the floating element with respect to the immovable element.

It will be seen from the foregoing description that I have provided an improved resilient wheel which is most efficient in carrying out the purposes and objects stated therefor, and it will be further seen that I have provided a wheel which in efficiency is superior to, less expensive, and generally more efficient than the present pneumatic tires in use on automobiles and other motor vehicles.

It is not claimed for this wheel that the parts are unbreakable but it is contended that the wear on the elements used in my improved device is much less than the wear on the present cushion and pneumatic tires in use. Moreover, in the event of damage or injury to any working part, the same may be readily replaced by the removal of one of the cover plates, the cost thereof being merely nominal, in contradistinction to the extreme high cost of pneumatic tubes and casings therefor.

It will further be seen that I have provided a simple, inexpensive and efficient means for carrying out the objects of the invention, and while I have particularly described the elements best adapted to perform the functions set forth, various changes in form, proportion and in the minor details of construction may be resorted to without departing from the spirit or sacrificing any of the principles of the invention.

I claim:—

1. A wheel of the class described comprising a hub, an annular member floating with respect to said hub, said member comprising an inner and outer rim integrally connected, yielding means between said hub and inner rim, additional yielding means cooperating with the aforesaid yielding means to retain said annular member in position, side plates secured to said hub, the peripheries thereof extending to points immediately adjacent the inner periphery of said outer rim, permitting a clearance with respect to the latter and dust shields secured to the outer rim overlapping said side plate extending the points adjacent said hub.

2. A wheel of the class described comprising a hub, an annular floating member including an outer and inner rim integrally connected by radial spokes, yielding means between said hub and inner rim, side plates secured to said hub and having their peripheries extended to points adjacent the outer rim of said annular member, providing a clearance with respect thereto, stop blocks carried between said side plates and arranged adjacent the peripheries thereof between the aforesaid spokes, pairs of spring members between said stop blocks and said spokes to position the annular floating member with respect to the side plates and permit torsonal movement in the operation of the wheel.

3. A wheel of the class described comprising a hub, an annular floating member including an outer and inner rim integrally connected by radial spokes, yielding means between said hub and inner rim, side plates secured to said hub and having their peripheries extended to points adjacent the outer rim of said annular member, providing a clearance with respect thereof, stop blocks of substantially V-shaped formation formed integral with one of said side plates, means securing the other side plate to said stop block, and pairs of coil springs having their inner opposed ends received within the ends of said stop blocks and connected at their outer ends with said spokes, whereby to properly position the annular floating member with respect to the side plates and permit of movement with respect thereto.

4. A wheel of the class described comprising a hub, an annular floating member including an outer and inner rim integrally connected by radial spokes, yielding means between said hub and inner rim, side plates secured to said hub and having their peripheries extended to points adjacent the outer rim of said annular member, providing a clearance with respect thereto, stop blocks of substantially V-shaped formation formed integral with one of said side plates and having sockets formed in the ends thereof, means for securing the other of said side plates to said stop blocks, said stop blocks being positioned adjacent the periphery of the side plates to which it is carried and disposed between pairs of spokes, and pairs of coil springs having their inner opposed ends received in the sockets of said stop blocks and connected at their outer ends with the respective spokes, whereby to position said annular floating member for proper action with respect to said hub.

5. A wheel of the class described comprising a hub, an annular floating member including an outer and inner rim integrally connected by radial spokes, yielding means between said hub and inner rim, side plates secured to said hub and having their peripheries extended to points adjacent the outer rim of said annular member, providing a clearance with respect thereto, stop blocks of substantially V-shaped formation formed integral with one of said side plates and having sockets formed in the ends thereof, means for securing the other of said side plates to said stop blocks, said stop blocks being positioned adjacent the periphery of the side plates to which it is carried and disposed between pairs of spokes, and pairs of coil springs having their inner opposed ends received in the sockets of said stop blocks and connected at their outer ends with the respective spokes, whereby to position said annular floating member for proper action with respect to said hub, and dust shields secured to the outer rim overlapping said side plates, said dust shields having central openings of sufficient diameter to permit clearance between the same and said hub.

In testimony whereof I affix my signature.

JAMES W. ROUPRICH.